Jan. 4, 1966          J. G. ANDERSON          3,226,877

PEST BIRD DESTROYING APPARATUS

Filed Nov. 29, 1963          2 Sheets-Sheet 1

INVENTOR.
JAMES G ANDERSON
BY
*Fetherstonhaugh & Co.*
ATTORNEYS

Jan. 4, 1966  J. G. ANDERSON  3,226,877
PEST BIRD DESTROYING APPARATUS
Filed Nov. 29, 1963  2 Sheets-Sheet 2
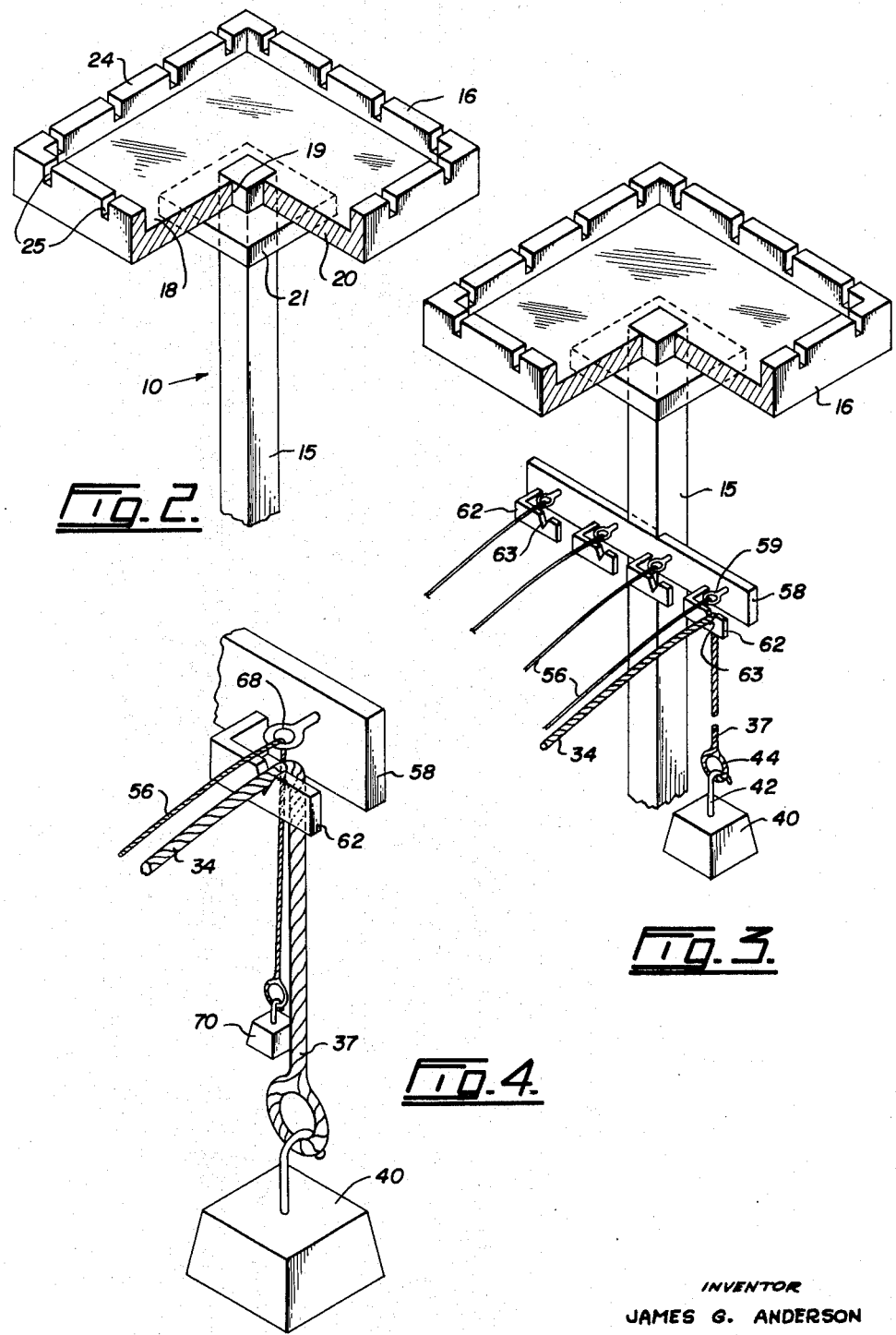
INVENTOR
JAMES G. ANDERSON
BY
Fetherstonhaugh & Co.
ATTORNEYS

United States Patent Office 3,226,877
Patented Jan. 4, 1966

3,226,877
PEST BIRD DESTROYING APPARATUS
James Glen Anderson, 2908 W. King Edward Ave.,
Vancouver, British Columbia, Canada
Filed Nov. 29, 1963, Ser. No. 327,022
Claims priority, application Canada, Dec. 7, 1962,
863,935
8 Claims. (Cl. 43—131)

This invention relates to apparatus for destroying pest birds.

In many sections of the country, certain birds are considered to be pests because they destroy crops, dig up planted seeds, destroy desirable insects, and for other reasons. Sometimes, pest birds accumulate in certain districts and become a menace. Efforts to destroy these birds, such as by shooting, are not very successful because of the great number of birds involved by the time they reach menacing proportions.

The main object of the present invention is the provision of apparatus for destroying pest birds which may be set up in areas where such birds are prevalent so that large numbers of the birds may be destroyed with relatively little danger to other desirable birds.

For example, starlings are considered in some sections of the country to be a menace and very undesirable. These birds congregate in large groups, and they usually keep other birds away from the areas in which they are present in great numbers. Apparatus according to the present invention is designed so that it may be set up in such an area in order to destroy large numbers of the starlings without fear of destroying any or many other birds which may be desirable to have in the area. The apparatus is such that it may be quickly set up and dismantled, and may be made in sections so as to be very large or relatively small, depending upon the number of birds that have to be destroyed.

The present apparatus includes a pair of spaced-apart supports and a treatment line stretching from one support to the other. Means is provided for attaching one end of the line to one support, the opposite end of the line movably extending over a portion of the other support, and weight means is connected to said opposite end for attaching the line to said other support and to maintain the line under tension and substantially horizontal between the supports. A contact poison is applied to the line between the supports. Any suitable contact poison may be used, such as chlorinated hydrocarbon dieldrin, endrin, aldrin, and the like. The contact poison is such that if a bird rests on the treated line, a comparatively small quantity of poison adhering to its feet is sufficient to kill the bird within a few hours.

There are times when it is desirable to put the apparatus out of operation. The treatment line may be lowered to the ground and left there, although this leaves the poison still exposed, or it may be taken away and stored until needed again. However, this would be a time-consuming and bothersome operation. It is preferable to provide means on the supports for preventing birds from roosting on the line. For this purpose, a thin cable is stretched between and secured to the supports, and suitable arrangements are made to have this thin cable, when in operation, extend immediately above the treatment line so that birds cannot roost on the line, and the cable is so thin that birds cannot normally roost on it. The thin cable may be fixedly secured to the supports, in which case the treatment line is shifted below the cable when the line is to be put out of commission, or the cable may be positioned immediately above the treated line and so connected to one or both of the supports that it can be slacked off and lowered below the level of the line when the latter is in operation.

A preferred form of the invention is illustrated by way of example in the accompanying drawings, in which:

FIGURE 2 is an enlarged perspective view of the upper end of one of the supports of the apparatus, parts of said support being broken away;

FIGURE 3 is a view similar to FIGURE 2, illustrating an alternative form of the apparatus; and FIGURE 4 is a fragmentary view of part of a support incorporating a variation of the alternative of FIGURE 3.

Figure 1:
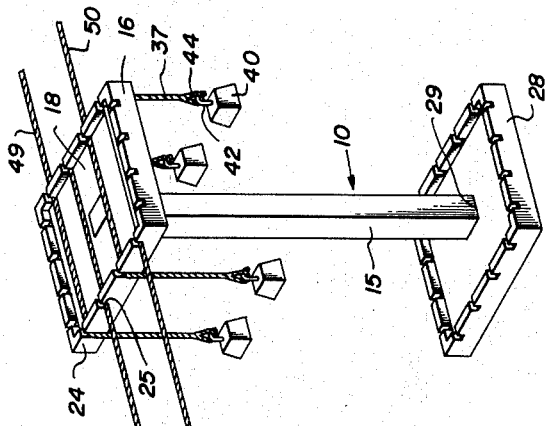
FIGURE 1 is a perspective view of the pest bird destroying apparatus.
Figure 1:
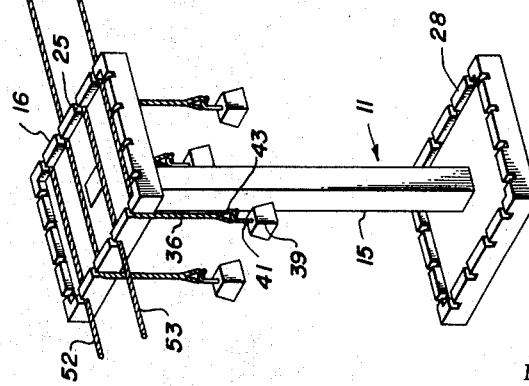

Referring to the drawings, the pest bird destroying apparatus includes a pair of supports 10 and 11 spaced from each other. As these supports are identical, only one, namely support 10, will be described in detail.

Support 10 comprises a tower including a vertical post 15 and a cross member 16 mounted on the upper end thereof. This cross member is preferably in the form of a tray 18 removably mounted on the upper end of the post in any convenient manner. For example, the tray may have a hole 19 centrally in the bottom 20 thereof and adapted to fit over the upper end of the post. The tray rests on a bracket 21 secured to the post spaced below the upper end thereof. Tray 18 is provided with an upstanding flange 24 extending around the edge thereof, and this flange has notches 25 formed in its upper edge.

Post 15 may extend into the ground or into a suitable base in the ground, but as it is desirable to make the apparatus portable so that it may be quickly and easily set up in different areas, tower 10 is provided with its own base 28 to which post 15 is removably secured. For the sake of convenience, base 28 may be exactly the same as tray 18 so that they are interchangeable. In this case, base 28 has a hole 29 formed centrally of the bottom thereof into which the lower end of post 15 removably fits. With this arrangement, when the tower is being set up, tray 18 and base 28 are interchangeable.

FIGURE 1 illustrates identical supports or towers 10 and 11 set up for operation. One or more treatment lines 34 are stretched between the towers and secured thereto, said lines being maintained substantially horizontal since birds will not roost on sloping or sagging lines. Each line may be fixedly secured to one tower and movably and removably secured to the other tower. However, the most convenient results are attained by removably securing the line to both towers and in such a way that the line is maintained taut at all times under varying weather conditions. In this example, each line 34 fits into notches 25 on the trays 18 of towers 10 and 11, and the ends 36 and 37 of the line hang downwardly from the tower trays at the outer edges of said trays. Weight 39 and 40 are removably secured to the ends 36 and 37 of the line in any suitable manner, such as by means of hooks 41 and 42, respectively, which fit into loops 43 and 44 formed on the ends of the line. Each line 34 has a contact poison applied thereto which, as stated above, is capable of penetrating the feet of birds roosting on the line in a short time.

When it is desired to use the apparatus, it is set up as illustrated in FIGURE 1. Towers 10 and 11 are erected at points spaced from each other, each line 34 is stretched across the two trays 18 and fitted into notches 25 thereof, and weights 39 and 40 are secured to the ends 36 and 37 of the line. These weights are sufficient to stretch line 34 into a taut position which is also horizontal. Trays 18 are such that any desired number of lines may be removably attached thereto. Two lines 34 are shown extending between the towers. This apparatus is designed so that it may be set up in sections in order to provide desired lengths of poisoned line. FIGURE 1 shows a pair of poisoned lines 49 and 50 and another pair of poisoned lines 52 and 53 attached to towers 10 and 11, respectively, and extending away therefrom to other towers, not shown.

Trays 18 are desirable in the towers, since suitable bait may be placed thereon to attract birds to the apparatus. This bait is usually such as to attract a certain type of bird, such as starlings. The attracted birds tend to roost on line 34. If a bird roosts for any length of time on the line, a small amount at least of the poison will penetrate throguh its feet, and a small amount will destroy the bird in a very short time. The poison on each line may be replenished by removing one of the weights from the end of the line and dropping the line to the ground for attention, or it may be applied thereto while the line remains in the air. There is little danger of harming desirable birds since large numbers of pest birds usually keep other birds away from the areas in which they congregate. As will readily be seen, the apparatus may extend over any required distance so that large numbers of the birds can be destroyed in a short time.

There may be times when it is desirable to put the apparatus out of operation without dismantling it, such as when a large number of desirable birds enter the area. For example, migrating birds might enter the area in such a number as to force the pest birds away for a time. Lines 34 may be dropped from the towers and left on the ground. However, this involves the risk of birds or animals coming into contact with the lines and being destroyed. The lines may be rolled up and stored, but this necessitates considerable handling, time and the necessary storage space.

It is preferable to provide the apparatus with means which make it possible quickly and easily to put treatment lines 34 out of and into operation. This is accomplished by providing a thin line or cable 56 for each line 34. Each cable 56 is stretched between towers 10 and 11 and secured thereto in any convenient manner. In this example of FIGURE 3, a cross bar 58 is secured to each post 15 below tray 18. The ends of cables 56 are secured to the bar by suitable loops 59. A hanger 62 is suspended from bar 58 and extends beneath the end of each cable 56 so that a notch 63 in said hanger is located immediately below the cable. When line 34 is not required, it is shifted below one of the cables 56 and placed in notches 63 of hangers 62 of the tower posts. Thus, each line 34 is stretched between the towers and is located immediately beneath a cable 56. Each cable is preferably formed of steel wire so that it does not stretch and contract much during changing atmospheric conditions, and it is so thin that birds cannot roost on it. Hangers 62 are so located relative to the cables that when a line 34 is mounted on said hangers, it is held very close to cable 56 and directly under it so that birds cannot roost on the line. Thus, treatment lines 34 are quickly and easily put out of operation by shifting them from the tower trays down on to hangers 62 beneath cables 56. When the lines are required again, they are quickly and easily shifted back to the tower trays. When lines 34 are in their inoperative positions, they cannot be of any danger to the birds, and yet they are readily available for use when they are next required.

An alternative arrangement of each treatment line 34 and its associated line or cable 56 is illustrated in FIGURE 4. Cable 56 is movably connected to cross bar 58 of the support by means of a loop 68 which, in turn, is fixedly secured to the bar. The cable extends through loop 68 and has a weight 70 fixedly or removably secured to the end thereof. The opposite end of cable 56 may be fixedly secured to the cross bar of the opposite support, or it may be movably secured thereto in the same manner as the cable and described above. Furthermore, in this alternative, treatment line 34 normally hangs over hanger 62 and cross member 16 is only a feed tray.

When cable 56 extends immediately above treatment line 34, as shown in FIGURE 4, birds cannot roost on said line. When it is desired to bring line 34 into operation, weight 70 is raised to allow cable 56 to drop below the level of the treatment line so that birds can roost on the latter. Thus, in order to put line 34 into and out of operation, it is only necessary to lower or raise, respectively, cable 56.

What I claim as my invention is:

1. Apparatus for destroying pest birds which comprises a pair of spaced-apart supports, a line stretched from one support to the other support, means connected to one end of the line connecting said end to one support, the other support having a portion over which the opposite end of the line movably extends and hangs therefrom, weight means connected to said opposite end hanging from the support portion and maintaining the line under tension and substantially horizontal between said supports, and a contact poison applied to the line between the supports.

2. Apparatus as claimed in claim 1 in which each weight means is removably connected to the line.

3. Apparatus for destroying pest birds which comprises a pair of spaced-apart supporting towers, a cross member on each tower, a line stretched from one tower to the other tower and extending over the cross members thereof, means attaching one end of the line to one cross member, the opposite end of the line hanging down from the adjacent cross member, weight means connected to said opposite end of the line to maintain the line under tension and substantially horizontal between the towers, and a contact poison applied to the line between the towers.

4. Apparatus for destroying pest birds which comprises a pair of spaced-apart supporting towers, a cross member on each tower, a line stretched from one tower to the other tower and extending over the cross members thereof, the ends of said line hanging down from the cross members, weight means connected to the hanging ends of the line to maintain the line under tension and substantially horizontal between the towers, and a contact poison applied to the line between the towers.

5. Apparatus for destroying pest birds which comprises a pair of spaced-apart supporting towers, a cross member on each tower and having a notch therein, a line stretched from one tower to the other tower and extending over the cross members and through the notches of the latter, the ends of said line hanging down from the cross members, weight means connected to the ends of the line to attach said line to the tower supports and to maintain the line under tension and substantially horizontal between the towers, and a contact poison applied to the line between the towers.

6. Apparatus as claimed in claim 3 in which each weight means is removably connected to the line, whereby when a weight means is removed from the line said line drops from the adjacent tower.

7. Apparatus as claimed in claim 3 in which each cross member is in the form of a tray adapted to hold bait for pest birds.

8. Apparatus as claimed in claim 3 in which each tower comprises a vertical post and the cross member thereof comprises a tray removably mounted on the top of said post.

References Cited by the Examiner
UNITED STATES PATENTS

| | | | |
|---|---|---|---|
| 1,566,970 | 12/1925 | Ridgley | 119—25 |
| 1,605,877 | 11/1926 | Voss | 119—25 |
| 2,304,593 | 12/1942 | Peles | 20—1 |
| 2,707,936 | 5/1955 | Kiehl | 119—26 |
| 3,148,417 | 9/1964 | Bellas | 40—1 |

FOREIGN PATENTS 23,553  9/1918  Denmark.

SAMUEL KOREN, *Primary Examiner.*

F. RAY CHAPPELL, ABRAHAM G. STONE,
*Examiners.*